United States Patent [19]

Malhotra

[11] Patent Number: 4,956,225

[45] **Date of Patent: * Sep. 11, 1990**

[54] TRANSPARENCY WITH A POLYMERIC SUBSTRATE AND TONER RECEPTIVE COATING

[75] Inventor: Shadi L. Malhotra, Mississauga, Canada

[73] Assignee: Xerox Corporation, Stamford, Conn.

[ * ] Notice: The portion of the term of this patent subsequent to Jun. 3, 2003 has been disclaimed.

[21] Appl. No.: 33,372

[22] Filed: Apr. 2, 1987

[51] Int. Cl.[5] ........................ B32B 27/06; B32B 9/04; G01D 9/00

[52] U.S. Cl. .................................... 428/216; 428/419; 428/484; 428/403; 428/518; 428/520; 428/918; 346/1.1; 346/135.1

[58] Field of Search ............... 428/216, 419, 484, 482, 428/518, 520, 918; 346/1.1, 135.1

[56] References Cited

U.S. PATENT DOCUMENTS

| | | | |
|---|---|---|---|
| 3,203,832 | 8/1965 | Mino et al. | 428/907.7 |
| 3,275,436 | 9/1966 | Mayer | 96/1 |
| 4,301,195 | 11/1981 | Mercer et al. | 427/261 |
| 4,370,379 | 1/1983 | Kato et al. | 428/341 |
| 4,419,004 | 12/1983 | Kuehnle | 355/3 TR |
| 4,480,003 | 10/1984 | Edwards et al. | 428/329 |
| 4,513,056 | 4/1985 | Vernois | 428/918 |
| 4,529,650 | 7/1985 | Martinez | 428/336 |
| 4,592,954 | 6/1986 | Malhotra | 428/335 |
| 4,599,293 | 7/1986 | Eckell et al. | 430/126 |

*Primary Examiner*—P. C. Sluby

*Attorney, Agent, or Firm*—Judith L. Byorick; Eugene O. Palazzo

[57] ABSTRACT

Disclosed is a transparency suitable for electrographic and xerographic imaging comprised of a polymeric substrate with a toner receptive coating on one surface thereof comprised of blends selected from the group consisting of: poly(ethylene oxide) and carboxymethyl cellulose; poly(ethylene oxide), carboxymethyl cellulose and hydroxypropyl cellulose; poly(ethylene oxide) and vinylidene fluoride/hexafluoropropylene copolymer; poly(chloroprene) and poly(α-methylstyrene); poly(caprolactone) and poly(α-methylstyrene); poly(vinyl isobutylether) and poly(α-methylstyrene); poly(caprolactone) and poly(p-isopropyl α-methylstyrene); blends of poly(1,4-butylene adipate) and poly(α-methylstyrene); chlorinated poly(propylene) and poly(α-methylstyrene); chlorinated poly(ethylene) and poly(α-methylstyrene); and chlorinated rubber and poly(α-methylstyrene). Also disclosed are transparencies with first and second coating layers.

19 Claims, No Drawings

TRANSPARENCY WITH A POLYMERIC SUBSTRATE AND TONER RECEPTIVE COATING

BACKGROUND OF THE INVENTION

This invention relates generally to transparencies useful in electrographic and xerographic imaging and printing processes, and more specifically to transparencies with certain coatings thereover, which transparencies, for example, possess compatibility with toner compositions, and permit improved toner flow in the imaged areas of the transparency thereby enabling images of high quality with no background deposits to be permanently formed thereon. Thus, in one embodiment, the present invention relates to transparencies comprised of a suitable supporting substrate with certain coatings thereover, such as blends of poly(ethylene oxide) with carboxymethyl cellulose, reference U.S. Pat. No. 4,592,954, the disclosure of which is totally incorporated herein by reference; and other coatings as illustrated herein, which transparencies are useful in electrographic and xerographic, imaging and printing processes. Additionally, in another embodiment of the present invention there are provided transparencies useful in electrographic and xerographic imaging systems which transparencies are comprised of a supporting substrate, a first coating of, for example, poly(vinylmethylether), and a second coating thereover of ethyl cellulose, or hydroxypropyl cellulose.

In the formation and development of xerographic images, there is generally applied to a latent image generated on a photoconductive member a toner composition comprised of resin particles and pigment particles. Thereafter, the image is transferred to a suitable substrate, and affixed thereto by, for example, heat, pressure, or a combination thereof. It is also known that transparencies can be selected as a receiver for the transferred developed image originating from the photoconductive member, which transparencies are suitable for selection with commercially available overhead projectors. Generally, these transparent sheets are comprised of thin films of one or more organic resins, such as polyesters, which have the disadvantage in that undesirable poor toner composition adhesion results with such materials.

Many different types of transparencies are known, reference for example U.S. Pat. No. 3,535,112, which illustrates transparencies comprised of a supporting substrate, and polyamide overcoatings. Additionally, there are disclosed in U.S. Pat. No. 3,539,340 transparencies comprised of a supporting substrate and coatings thereover of vinylchloride copolymers. Also known are transparencies with overcoatings of styrene acrylate, or methacrylate ester copolymers, reference U.S. Pat. No. 4,071,362; transparencies with blends of acrylic polymers and vinyl chloride/vinylacetate polymers, as illustrated in U.S. Pat. No. 4,085,245; and transparencies with coatings of hydrophilic colloids as recited in U.S. Pat. No. 4,259,422. Furthermore, there is illustrated in U.S. Pat. Nos. (1) 4,489,122 transparencies with elastomeric polymers overcoated with poly(vinylacetate), or terpolymers of methylmethacrylate, ethyl acrylate, and isobutylacrylate; and (2) 4,526,847 transparencies comprised of overcoatings of nitrocellulose.

With further respect to the prior art, there are illustrated in U.S. Pat. No. 4,370,379 transparencies with, for example, a polyester (Mylar) substrate with a transparent plastic film substrate 2, and an undercoating layer 3 formed on at least one surface of the substrate 2, and a toner receiving layer 4 formed on the undercoated layer, reference column 2, line 44. As coatings for layer 3, there can be utilized the resins as illustrated in column 3, including quaternary ammonium salts, while for layer 4 there are selected thermoplastic resins having a glass transition temperature of from a minus 50 to a minus 150° C., such as acrylic resins, including ethylacrylate, methylmethacrylate, and propyl methacrylate; and acrylic acid, methacrylic acid, maleic acids, and fumaric acid, reference column 4, lines 23 to 65. At line 61 of this patent, there is mentioned that thermoplastic resin binders other than acrylic resins can be selected, such as styrene resins, including polystyrene, and styrene butadiene copolymers, vinyl chloride resins, vinylacetate resins, and solvent soluble linear polyester resins. A similar teaching is present in U.S. Pat. No. 4,480,003 wherein there is disclosed a transparency film comprised of a film base coated with an image receiving layer containing thermoplastic transparent polymethacrylate polymers, reference column 2, line 16, which films are useful in plain paper electrostatic copiers. Other suitable materials for the image receiving layer include polyesters, cellulosics, polyvinyl acetates, and acrylonitrile-butadiene styrene terpolymers, reference column 3, lines 45 to 53. Similar teachings are present in U.S. Pat. No. 4,599,293, wherein there is described a toner transfer film for picking up a toner image from a toner treated surface, and affixing the image, wherein the film consists of a clear transparent base and a layer firmly adhered thereto, which is also clear and transparent, and is comprised of the specific components as detailed in column 2, line 16. Examples of suitable binders for the transparent film that are disclosed in this patent include polymeric or prepolymeric substances, such as styrene polymers, acrylic, and methacrylate ester polymers, styrene butadienes, isoprenes, and the like, reference column 4, lines 7 to 39. The coatings recited in the aforementioned patents contain primarily amorphous polymers which do not undergo the desired softening during the fusing of the xerographic imaging process, and therefore these coatings do not aid in the flow of pigmented toners. This can result in images of low optical density. In contrast with the coatings of the present invention, which include, for example, polymers with a high degree of crystallinity and sharp melting points, there is enabled an increase in toner flow in the imaged areas thus yielding images, especially with mixed colors such as green, black and purple with acceptable optical density values as indicated hereinafter.

Patents of background interest include U.S. Pat. Nos. 3,275,436; 3,854,942; 4,294,422; 4,301,195; 4,419,004; 4,419,005; 4,489,122; and 4,529,650. Also known are thermal transfer imaging sheets containing certain coating compositions thereof, and more specifically processes for obtaining transparencies suitable for the effective transfer of developed images from a donor sheet which comprises providing a transparent substrate, and applying a coating thereto selected from poly(vinylethers), poly(acrylic acids), poly(methacrylic acids esters), reference U.S. Ser. No. 666,702 relating to thermal transfer printing sheets.

Moreover, there are known coatings for ink jet transparencies including blends of carboxylated polymers with poly(alkylene glycol), reference U.S. Pat. No. 4,474,850; transparencies containing blends of poly(vinyl pyrrolidone) with matrix forming polymers such as gelatin or poly(vinyl alcohol), swellable by water and insoluble at room temperature but soluble at elevated temperatures, reference U.S. Pat. No. 4,503,111; and ink jet transparencies comprised of blends of poly(ethylene oxide) with carboxymethyl cellulose as illustrated in U.S. Pat. No. 4,592,954, the disclosure of which is totally incorporated herein by reference.

Although the transparencies illustrated in the prior art are suitable in most instances for their intended purposes, there remains a need for new transparencies with coatings thereover that are useful in electrographic and xerographic imaging processes, and that will enable the formation of images with high optical densities. Additionally, there is a need for transparencies which permit improved toner flow in the imaged areas thereby enabling higher quality transparencies with acceptable optical densities. There is also a need for transparencies with specific coatings that possess other advantages, inclusive of enabling excellent adhesion between the toned image and the transparency or coated papers selected, and wherein images with excellent resolution and no background deposits are obtained.

SUMMARY OF THE INVENTION

It is an object of the present invention to provide transparencies with the above-noted advantages.

Another object of the present invention resides in the provision of transparencies with certain coatings, which transparencies are useful in electrographic, especially ionographic, and xerographic imaging processes.

Also, in another object of the present invention there are provided transparencies with certain coatings thereover enabling images with high optical densities, and wherein increased toner flow is obtained when imaged with commercially available xerographic imaging apparatuses and ionographic printers, inclusive of printers commercially available from Delphax such as the Delphax S-6000.

Another object of the present invention resides in transparencies that permit the substantial elimination of beading during mixing of the primary colors to generate secondary colors such as, for example, mixtures of cyan and yellow enabling green colors.

Moreover, another object of the present invention resides in transparencies that have substantial permanence for extended time periods.

In yet another object of the present invention there are provided coatings which are compatible with filled papers, sized papers and opaque Mylars, which coatings will enable the aforementioned substrates to generate high optical density images with electrographic and xerographic processes.

In still another object of the present invention there are provided polymer coatings for transparencies, which coatings enable fast transparentization of images on treatment with 1, 1, 1, trichloro ethane in the solvent-vapor fusing process subsequent to the imaging of these transparencies in, for example, the Xerox Corporation 1005$^R$ color apparatus.

These and other objects of the present invention are accomplished by providing transparencies with certain coatings thereover. Therefore, in accordance with one embodiment of the present invention there are provided transparencies with coatings thereover which are compatible with the toner compositions selected for development, and wherein the coatings enable images with acceptable optical densities to be obtained. More specifically, in one embodiment of the present invention there are provided transparencies for xerographic and ionographic processes comprised of a supporting substrate and a coating, or coatings thereover comprised of, for example, blends of carboxymethyl cellulose and poly(ethylene oxide), reference U.S. Pat. No. 4,592,954, the disclosure of which is totally incorporated herein by reference.

There is thus provided in accordance with one specific aspect of the present invention transparencies suitable for electrographic and xerographic imaging comprised of a polymeric substrate with a toner receptive coating on one surface thereof, which coating is comprised of blends of: poly(ethylene oxide) and carboxymethyl cellulose; poly(ethylene oxide), carboxymethyl cellulose and hydroxypropyl cellulose; poly(ethylene oxide) and vinylidene fluoride/hexafluoropropylene copolymer; poly(chloroprene) and poly(α-methylstyrene); poly(caprolactone) and poly(α-methylstyrene); poly(vinylisobutylether) and poly(α-methylstyrene); blends of poly(caprolactone) and poly(p-isopropyl α-methylstyrene); blends of poly(1,4-butylene adipate) and poly(α-methylstyrene); chlorinated poly(propylene) and poly(α-methylstyrene); chlorinated poly(ethylene) and poly(α-methylstyrene); and chlorinated rubber and poly(α-methylstyrene). Further, in another specific aspect of the present invention there are provided transparencies suitable for electrographic and xerographic imaging processes comprised of a supporting polymeric substrate with a toner receptive coating on one surface thereof comprised of: (a) a first layer coating of a crystalline polymer selected from the group consisting of poly(chloroprene), chlorinated rubbers, blends of poly(ethylene oxide), and vinylidene fluoride/hexafluoropropylene copolymers, chlorinated poly(propylene), chlorinated poly(ethylene), poly(vinylmethyl ketone), poly(caprolactone), poly(1,4-butylene adipate), poly(vinylmethyl ether), and poly(vinyl isobutylether); and (b) a second overcoating layer comprised of a cellulose ether selected from the group consisting of hydroxypropyl methyl cellulose, hydroxypropyl cellulose, and ethyl cellulose. Moreover, in another specific embodiment of the present invention there are provided transparencies comprised of a supporting substrate and a toner receptive coating comprised of a blend of from about 25 percent by weight to about 65 percent by weight of poly(ethylene oxide), from about 65 percent by weight to about 33 percent by weight of carboxymethyl cellulose, and from about 10 percent by weight to about 2 percent by weight of hydroxypropyl cellulose. In a very specific embodiment of the present invention, there are provided transparencies comprised of a supporting substrate and thereover a blend comprised of 45 percent by weight of poly(ethylene oxide), 45 percent by weight of carboxymethyl cellulose, and 10 percent by weight hydroxypropyl cellulose.

Illustrative examples of supporting substrates with a thickness of from about 75 microns to about 125 microns, and preferably of a thickness of from about 100 microns to about 125 microns that may be selected for the transparencies of the present invention include Mylar, commercially available from E. I. DuPont; Melinex, commercially available from Imperial Chemical, Inc.; Celanar, commercially available from Celanese, Inc.; polycarbonates, especially Lexan; polysulfones; cellulose triacetate; polyvinylchlorides; and the like, with Mylar being particularly preferred because of its availability and lower costs.

Illustrative examples of specific single layer coatings that can be selected for the aforementioned electrographic and xerographic transparency substrate include: blends of poly(ethylene oxide) (POLY OX WSRN-3000, Union Carbide) from about 25 percent by weight to about 60 percent by weight, and carboxymethyl cellulose (CMC 7HOF, Hercules) from about 75 percent by weight to about 40 percent by weight in water, reference U.S. Pat. No. 4,592,954, the disclosure of which is totally incorporated herein by reference; blends of poly(ethylene oxide) (POLY OX WSRN-3000, Union Carbide) from about 25 percent by weight to about 60 percent by weight, carboxymethyl cellulose (CMC 7HOF, Hercules) from about 65 percent by weight to about 38 percent by weight, and hydroxypropyl cellulose (KLUCEL, Hercules) from about 10 percent by weight to about 2 percent by weight in water; blends of poly(vinylisobutyl ether) from about 15 percent by weight to about 85 percent by weight, and poly(α-methylstyrene) (Molecular weight $M=1.0\times10^5$) from about 85 percent by weight to about 15 percent by weight in toluene; blends of poly(caprolactone) (PLC-700, Union Carbide) from about 5 percent by weight to about 95 percent by weight, and poly(α-methylstyrene) ($M=1.0\times10^5$) from about 95 percent by weight to about 5 percent by weight in toluene; blends of poly(ethylene oxide) (POLYOX WSRN-3000, Union Carbide) from about 10 percent by weight to about 40 percent by weight, and vinylidene fluoride/-hexafluoropropylene copolymer (Hexafluoropropylene content from 40 percent by weight to about 70 percent by weight) from about 90 percent by weight to about 60 percent by weight in methylethyl ketone and in tetrahydrofuran; blends of poly(1,4-butylene adipate) (Scientific Polymer Products) from about 10 percent by weight to about 50 percent by weight, and poly(α-methylstyrene) from about 90 percent by weight to about 50 percent by weight in toluene; blends of poly(caprolactone) from about 5 percent by weight to about 95 percent by weight, and poly(p-isopropyl α-methylstyrene) from about 95 percent by weight to about 5 percent by weight in toluene; blends of chlorinated poly(propylene) (Scientific Polymer Products) from about 5 percent by weight to about 95 percent by weight, and poly(α-methylstyrene) from about 95 percent by weight to about 5 percent by weight in toluene; blends of chlorinated rubber (Scientific Polymer Products) from about 5 percent by weight to about 95 percent by weight and poly(α-methylstyrene) from about 95 percent by weight to about 5 percent by weight in toluene; and blends of chlorinated poly(ethylene) from about 5 percent by weight to about 95 percent by weight, and poly(α-methylstyrene) from about 95 percent by weight to about 5 percent by weight in toluene.

Further specific examples of single layer coatings that may be selected for the electrographic and xerographic transparencies of the present invention include: blends of poly(ethylene oxide) 40 percent by weight, and carboxymethyl cellulose 60 percent by weight; blends of poly(ethylene oxide) 45 percent by weight, carboxymethyl cellulose 45 percent by weight, and hydroxypropyl cellulose 10 percent by weight; blends of poly(-vinylisobutylether) 30 percent by weight, and poly(α-methylstyrene) 70 percent by weight; blends of poly(caprolactone) 15 percent by weight, and poly(α-methylstyrene) 85 percent by weight; blends of poly(ethylene oxide) 25 percent by weight, and vinylidene fluoride/-hexafluoropropylene (70 percent hexafluoropropylene) 75 percent by weight; blends of poly(1,4-butylene adipate) 25 percent by weight, and poly(α-methylstyrene) 75 percent by weight; blends of poly(caprolactone) 25 percent by weight, and poly(p-isopropyl α-methylstyrene) 75 percent by weight; blends of chlorinated poly(-propylene) 25 percent by weight, and poly(α-methylstyrene) 75 percent by weight; blends of chlorinated rubber 25 percent by weight, and poly(α-methylstyrene) 75 percent by weight; and blends of chlorinated poly(ethylene) 25 percent by weight, and poly(α-methylstyrene) 75 percent by weight.

The aforementioned coatings, which are applied to one side of the supporting substrate in a thickness, for example, of from about 2 to about 5 microns, can be formed by a number of known techniques including reverse roll and extrusion processes. In reverse roll coating, the premetered material is transferred from a steel applicator roll to the supporting web material, such as Mylar moving in the opposite direction. Metering is performed in the gap precision-ground stainless steel rolls. The metering roll is stationary or is rotating slowly in the opposite direction of the applicator roll, also referred to as the transfer roll, which roll rotates with a surface speed one-half to twice the speed of the Mylar. Also, the Mylar can be supported by a soft-backing roll, which serves to wipe the coating from the applicator roll as it passes. Slot extrusion coating utilizes a flat die to apply coating materials with the die lips in close proximity to the supporting substrate such as Mylar. The precise premetering capabilities of a positive displacement pump can be used even though the coating material does not form a film. Once the desired amount of coating has been applied to the web, the coating is dried at 50° to 70° C. in an air dryer.

Examples of first and second layered coatings in contact with each other and present on the supporting substrate include (a) a first overcoating layer comprised of a crystalline polymer selected from the group consisting of poly(chloroprene) dissolved in 2 percent by weight of toluene; chlorinated rubber dissolved in 2 percent by weight of toluene; chlorinated poly(propylene) dissolved in 2 percent by weight of toluene; chlorinated poly(ethylene) dissolved in 2 percent by weight of toluene; poly(vinylmethyl ketone) dissolved in 2 percent by weight of tetrahydrofuran; poly(caprolactone) dissolved in 2 percent by weight of toluene; poly(1,4-butylene adipate) dissolved in 2 percent by weight of toluene; blends of poly(ethylene oxide), and vinylidene fluoride/hexafluoropropylene copolymer dissolved in 2 percent by weight methylethyl ketone and tetrahydrofuran; poly(vinylmethylether) dissolved in 2 percent by weight of toluene; poly(-vinylisobutylether) dissolved in 2 percent by weight of toluene; and (b) a second overcoating layer comprised of a cellulose ether selected from the group consisting of hydroxypropyl cellulose, hydroxypropylmethyl cellulose and ethyl cellulose dispersed, for example, in from about 0.3 percent by weight to about 1.0 percent by weight of aliphatic alcohols such as methanol. These coatings are applied to the supporting substrates such as Mylar by a number of techniques including reverse roll and extrusion processes as illustrated herein. The thickness of the first layer varies from about 2 to about 5 microns whereas the thickness of the second overcoating layer is from about 0.5 to about 2 microns.

In one important specific embodiment of the present invention, there are provided transparencies prepared by selecting a Mylar substrate in a thickness of 125 microns, and applying on one side thereof by a reverse roll process in a thickness of 2 microns a polymer blend comprised of poly(ethylene oxide) 45 percent by weight, carboxymethyl cellulose 45 percent by weight, and hydroxypropyl cellulose 10 percent by weight. Coating is affected from a 1 percent solution blend of water, for example, about 80 percent, and ethanol or other aliphatic alcohol about 20 percent by weight having incorporated therein the polymer blend mixture. Thereafter, the coating is air dried and the resulting transparency with a paper backing can be utilized in a xerographic imaging apparatus such as the Xerox Corporation 1005$^R$ color copier.

The following examples are being supplied to further define specific embodiments of the present invention, it being noted that these examples are intended to illustrate and not limit the scope of the present invention. Parts and percentages are by weight unless otherwise indicated. Also, the optical density measurements recited herein were obtained on a Pacific Spectrograph Color System. The system consists of two major components: an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters, and the entry of tristimulous values; and an alphanumeric keyboard for entry of product standard information. Further, the transparencies were all prepared in substantially a similar manner.

EXAMPLE I

There were prepared by a reverse roll process coated transparencies by providing a Mylar substrate in a thickness of 100 microns, and coating thereover a blend of poly(caprolactone) 25 percent by weight and poly(α-methylstyrene) ($M=1.0\times10^5$) 75 percent by weight, which blend was present in a concentration of 2 percent by weight in toluene. Subsequent to drying in air, the difference in weight prior to and after coating was monitored. There resulted a coated transparency with 2 grams per square meter of coating on one side of the Mylar. The thickness of the coating blend as measured with a gauge was 2 microns. Thereafter, the coated transparency was fed into a Xerox Corporation 1025$^R$ imaging apparatus, and there were obtained images of high resolution with an optical density of 1.1. These images could not be hand wiped or lifted with a 3M scotch tape 60 seconds subsequent to their preparation.

EXAMPLE II

There was prepared by a reverse roll process a coated transparency by immersing a Mylar substrate in a thickness of 100 microns into a 2 percent (2 grams of the polymer blend per 100 milliliters of toluene) by weight of a toluene solution of poly(vinylmethyl ether). Subsequent to drying in air, the difference in weight was found to be 2 grams per square meter of a coating thickness of 2 microns on one side of the transparency. The coated transparency was then overcoated by a reverse roll process with a solution of ethyl cellulose which was present in a concentration of 0.3 percent by weight in methanol. The second overcoat layer was 0.3 to 0.4 micron thick. Thereafter, the prepared two layered transparency was fed into a Delphax S-6000 printer having incorporated therein a cold pressure fixable toner composition available from Delphax, Inc. as Delphax Ionographic TM toner. The optical density of the resulting images was recorded at 1.9. These images could not be hand wiped or lifted with a 3M scotch tape 60 seconds subsequent to their preparation.

EXAMPLE III

There was prepared by a reverse roll process a coated transparency by immersing a Mylar substrate with a thickness of 100 microns into a blend of poly(ethylene oxide) (Poly OX-WSRN-3000, Union Carbide) 40 percent by weight, and carboxymethyl cellulose (CMC 7HOF, Hercules) 60 percent by weight, which blend was present in a concentration of 3 percent by weight in water. There resulted a coated transparency which had present on one side 2 grams per square meter coating of the polymer in a thickness of 2 microns. Subsequently, the coated transparency was then fed into a Xerox Corporation 1025$^R$ xerographic imaging apparatus, and there were obtained images of an optical density of 1.2. These images could not be hand wiped or lifted with a 3M scotch tape 50 seconds after their preparation.

EXAMPLE IV

The procedure of Example II was repeated with the exception that the Mylar was coated in a thickness of 2 microns with a solution of poly(chloroprene) dissolved in 2 percent by weight of toluene, and there was selected as a second overcoat layer in a thickness of 1 micron hydroxypropylmethyl cellulose dissolved in 1 percent by weight of methanol. Subsequently, the resulting two layered transparency was fed into a Delphax S-6000 printer having incorporated therein a cold pressure fixable Delphax Ionographic$^R$ toner composition available from Delphax Inc., and images of a high optical density of 1.7 were obtained, which images could not be hand wiped or lifted with a 3M scotch tape after 45 seconds.

EXAMPLE V

There were prepared by a reverse roll process coated transparencies by immersing a Mylar substrate in a thickness of 125 microns into a ternary blend of poly(ethylene oxide) 45 percent by weight, carboxymethyl cellulose, 45 percent by weight, and hydroxypropyl cellulose 10 percent by weight, which blend was present in a concentration of 1 percent by weight in water. There resulted a transparency which had present on one side 2 grams per square meter of the coating blend in a thickness of 2 microns. Subsequently, the coated transparency was fed into a Xerox Corporation 1005$^R$ xerographic color imaging apparatus, and there were obtained images with no background deposits, which images were vapor fused in an apparatus commercially available from Xerox Corporation as the Xerox VFA for a period of 60 seconds with the solvent 1,1,1 trichloroethane. The optical density of these images was 0.88 (black), 0.87 (magenta), 0.64 (cyan), 0.68 (yellow), 0.83 (red), 0.51 (green), and 0.88 (violet). A commercially available transparency (Xerox 3R2780) when fed into the Xerox Corporation 1005$^R$ imaging apparatus yielded images with optical densities of 0.81 (black), 0.73 (magenta), 0.49 (cyan), 0.54 (yellow), 0.74 (red), 0.38 (green), and 0.77 (violet). Transparencies prepared by coating on Mylar from a solution of poly(methyl methacrylate) in toluene via reverse roll coating process had optical density values of 0.69 (black), 0.76 (magenta), 0.45 (cyan), 0.64 (yellow), 0.76 (red), 0.38 (green), and 0.75 (violet) after being fed into the Xerox Corporation $1005^R$ imaging apparatus.

Other modifications of the present invention will occur to those skilled in the art subsequent to a reading of the present application, and those modifications and equivalents thereof are intended to be included within the scope of the present invention.

What is claimed is:

1. A transparency comprised of a polymeric substrate with a toner receptive coating on one surface thereof comprised of blends selected from the group consisting of: poly(ethylene oxide) and carboxymethyl cellulose; poly(ethylene oxide), carboxymethyl cellulose and hydroxypropyl cellulose; poly(ethylene oxide) and vinylidene fluoride/hexafluoropropylene copolymer; poly(chloroprene) and poly(α-methylstyrene); poly(caprolactone) and poly(α-methylstyrene); poly(vinyl isobutylether) and poly(α-methylstyrene); poly(caprolactone) and poly(p-isopropyl α-methylstyrene); poly(1,4-butylene adipate) and poly(α-methylstyrene); chlorinated poly(propylene) and poly(α-methylstyrene); chlorinated poly(ethylene) and poly(α-methylstyrene); and chlorinated rubber and poly(α-methylstyrene), wherein said transparency is selected as an image receiving sheet for electrophotographic or ionographic imaging processes.

2. A transparency comprised of a polymeric substrate with a toner receptive coating on one surface thereof comprised of: (a) a first layer coated with a crystalline polymer selected from the group consisting of poly(chloroprene), chlorinated rubber, blends of poly(ethylene oxide) and a vinylidene fluoride/hexafluoropropylene copolymer, chlorinated poly(propylene), chlorinated poly(ethylene), poly(vinylmethyl ketone), poly(caprolactone), poly(1,4-butylene adipate), poly(vinylmethyl ether), and poly(vinyl isobutylether); and (b) a second overcoating layer comprised of a cellulose ether selected from the group consisting of hydroxypropyl methyl cellulose, hydroxypropyl cellulose, and ethyl cellulose, wherein said transparency is selected as an image receiving sheet for electrophotographic or ionographic imaging processes.

3. A transparency in accordance with claim 1 wherein the toner receptive coating is comprised of a blend from about 5 percent by weight to about 95 percent by weight of poly(chloroprene), and from about 95 percent by weight to about 5 percent by weight of poly(α-methylstyrene).

4. A transparency in accordance with claim 1 wherein the toner receptive coating is comprised of a blend of from about 15 percent by weight to about 85 percent by weight of poly(caprolactone), and from about 85 percent by weight to about 15 percent by weight of poly(α-methylstyrene).

5. A transparency in accordance with claim 1 wherein the toner receptive coating is comprised of a blend of from about 15 percent by weight to about 85 percent by weight of poly(vinyl isobutylether), and from about 85 percent by weight to about 15 percent by weight of poly(α-methylstyrene).

6. A transparency in accordance with claim 1 wherein the toner receptive coating is comprised of a blend of from about 25 percent by weight to about 65 percent by weight of poly(ethylene oxide), from about 65 percent by weight to about 33 percent by weight of carboxymethyl cellulose, and from about 10 percent by weight to about 2 percent by weight of hydroxypropyl cellulose.

7. A transparency in accordance with claim 1 wherein the toner receptive coating is comprised of a blend of from about 5 percent by weight to about 95 percent by weight of poly(caprolactone), and from about 95 percent by weight to about 5 percent by weight of poly(p-isopropyl α-methylstyrene).

8. A transparency in accordance with claim 1 wherein the toner receptive coating is comprised of a blend of from about 25 percent by weight to about 60 percent by weight of poly(ethylene oxide), and from about 75 percent by weight to about 40 percent by weight of carboxymethyl cellulose.

9. A transparency in accordance with claim 1 wherein the toner receptive coating is comprised of a blend of from about 10 percent by weight to about 40 percent by weight of poly(ethylene oxide), and from about 90 percent by weight to about 60 percent by weight vinylidene fluoride/hexafluoropropylene copolymer with a hexafluoropropylene content of from about 40 to about 70 percent by weight.

10. A transparency in accordance with claim 1 wherein the toner receptive coating is comprised of a blend of from about 10 percent by weight to about 50 percent by weight of poly(1,4-butylene adipate), and from about 90 percent by weight to about 50 percent by weight of poly(α-methylstyrene).

11. A transparency in accordance with claim 1 wherein the toner receptive coating is comprised of a blend of from about 5 percent by weight to about 95 percent by weight of chlorinated poly(propylene), and from about 95 percent by weight to about 5 percent by weight of poly(α-methylstyrene).

12. A transparency in accordance with claim 1 wherein the toner receptive coating is comprised of a blend of from about 5 percent by weight to about 95 percent by weight of chlorinated poly(ethylene), and from about 95 percent by weight to about 5 percent by weight of poly(α-methylstyrene).

13. A transparency in accordance with claim 1 wherein the toner receptive coating is comprised of a blend of from about 5 percent by weight to about 95 percent by weight of chlorinated rubber, and from about 95 percent by weight to about 5 percent by weight of poly(α-methylstyrene).

14. A transparency in accordance with claim 1 wherein the supporting substrate is selected from the group consisting of cellulose acetate, poly(sulfone), poly(propylene), poly(vinyl chloride), and poly(ethylene terephthalate).

15. A transparency in accordance with claim 1 wherein the coating is present in a thickness from about 2 to about 5 microns.

16. A transparency which comprises a polymeric substrate with a toner receptive coating on one surface thereof, said coating comprising blends selected from the group consisting of: poly(ethylene oxide) and vinylidene fluoride/hexafluoropropylene copolymer; poly(chloroprene) and poly(α-methylstyrene); poly(caprolactone) and poly(α-methylstyrene); poly(vinyl isobutylether) and poly(α-methylstyrene); poly(caprolactone) and poly(p-isopropyl α-methylstyrene); poly(1,4-butylene adipate) and poly(α-methylstyrene);

chlorinated poly(propylene) and poly(α-methylstyrene); chlorinated poly(ethylene) and poly(α-methylstyrene); and chlorinated rubber and poly(α-methylstyrene), wherein said transparency is selected as an image receiving sheet for electrophotographic or ionographic imaging processes.

17. A transparency in accordance with claim 1 wherein said transparency is selected as an image receiving sheet for xerographic imaging processes.

18. A transparency in accordance with claim 2 wherein said transparency is selected as an image receiving sheet for xerographic imaging processes.

19. A transparency in accordance with claim 16 wherein said transparency is selected as an image receiving sheet for xerographic imaging processes.

* * * * *